Oct. 31, 1967     G. H. WATSON     3,349,531
FRANGIBLE CONNECTOR ASSEMBLY FOR STANCHIONS, POLES AND STANDARDS
Filed July 16, 1964     2 Sheets-Sheet 1
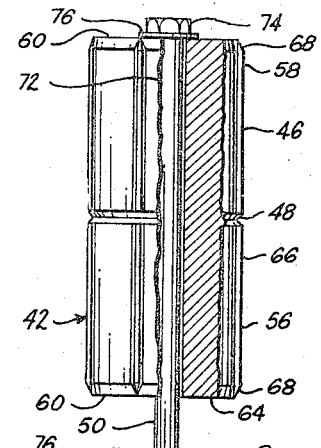
Fig. 2.
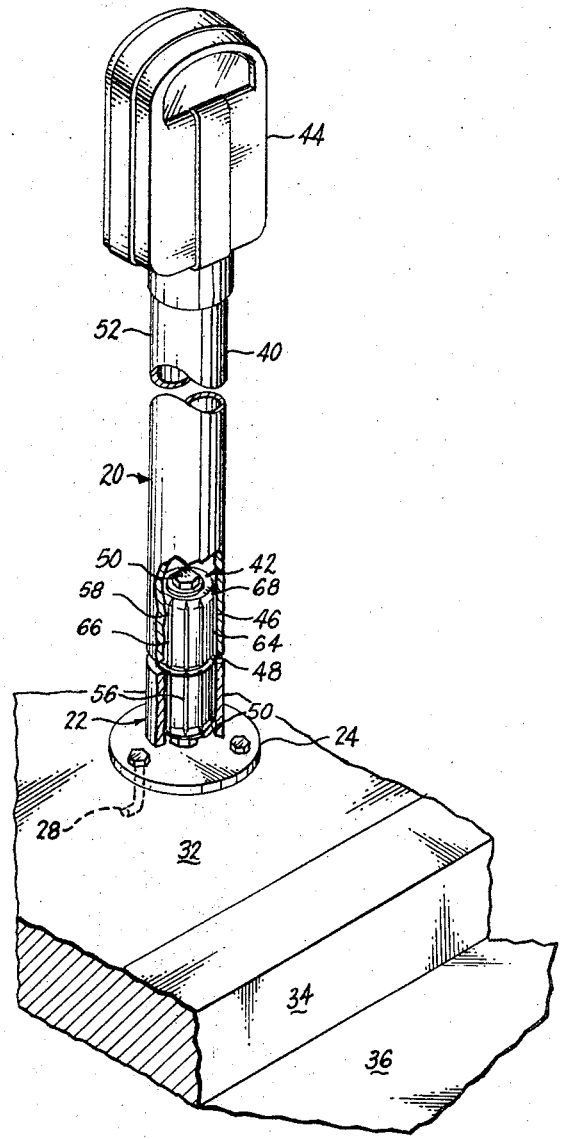
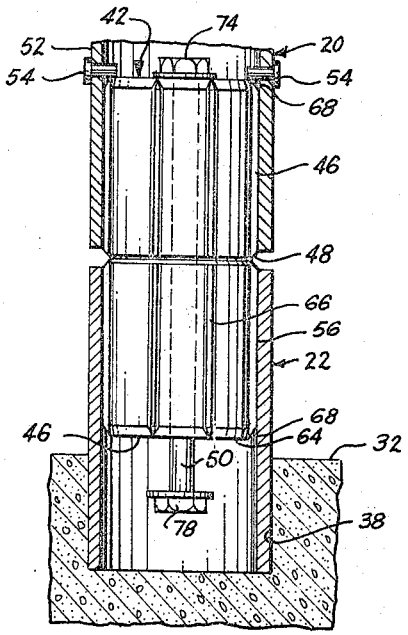
Fig. 1.     Fig. 3.
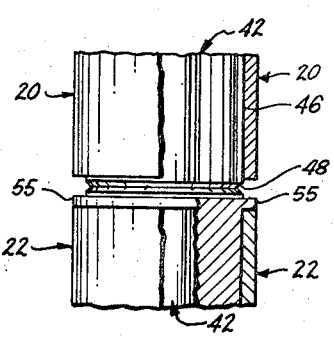
Fig. 4.
INVENTOR.
GEORGE H. WATSON
BY
Smith & Mattern
ATTORNEYS Oct. 31, 1967  G. H. WATSON  3,349,531
FRANGIBLE CONNECTOR ASSEMBLY FOR STANCHIONS, POLES
AND STANDARDS
Filed July 16, 1964  2 Sheets-Sheet 2

INVENTOR.
GEORGE H. WATSON
BY Smith & Mattern
ATTORNEYS

United States Patent Office 3,349,531
Patented Oct. 31, 1967

3,349,531
FRANGIBLE CONNECTOR ASSEMBLY FOR
STANCHIONS, POLES AND STANDARDS
George H. Watson, 11530 Holmes Point Drive NE.,
Kirkland, Wash. 98033
Filed July 16, 1964, Ser. No. 383,193
4 Claims. (Cl. 52—296)

ABSTRACT OF THE DISCLOSURE

An impact frangible and bendable connector assembly for installation in an overall upright structure, such as a stanchion, pole, post or other support which may be used for example to position traffic signs, parking meters and street name markers to predetermine both its fracturing and bending location in anticipation of its damage upon an accidental impact comprising a body with a frangible section between its ends and having portions adapted to supportingly complement portions of the supporting structure to be respectively positioned with the body on each side of its frangible section and a bendable longitudinal coupling extending through the body and effective to limit separation of the connector parts after said connector has been broken by impact.

---

This invention relates to upright structures, such as stanchions, poles and standards which may be used to support traffic signs, parking meters and street name markers. More particularly, the invention pertains to frangible and bendable connector assemblies to be included in such upright structures to predetermine their fracturing and bending locations in anticipation of vehicles striking them.

The purpose of the invention is to provide such connector or coupling assemblies for installation in resulting upright structures which effectively predetermine both a failure and bending location where the connector is installed. Thereafter, when a resulting upright structure is accidentally struck by a vehicle or in some other severe manner, damage is concentrated in such frangible connector assembly. Generally, repairs are limited to replacement of this connector at substantially lower cost than any cost that would be incurred if an entire upright structure, not so equipped with such a connector, had received a like blow and was repaired and replaced. In most instances when meter sign and marker standards equipped with this frangible coupling are subjected to a blow, the force of which, without this connector installation, would bend the pipe standard and/or break the concrete footing, the resulting needed repairs are effected by replacing only the connector.

In fulfilling this inventive purpose, these exemplary objectives have been met:

Connectors or couplings are made, in reference to their breakable portions, of metal, plastic, or other brittle compositions;

Connectors are readily provided in selective sizes to be installed in various upright structural supports now in use;

A connector arranged as an insert has tapered ends to facilitate interengagement of its ends with respective lower and upper portions of such upright structural supports or stanchions;

Some connectors have spaced ribs or lands so some cross-section distortion is possible and sliding-mating friction is reduced when a swedging assembly procedure is followed;

All connectors have restrictive interior structures, for example, as may be formed by leaving internal material upon making a hollow core, which position a smaller diameter, bendable, slidable, central, longitudinal, potential coupling, such as cable or a bolt having axial positioners on its ends which serves as a secondary connecting structure between resulting lower and upper portions of a damaged connector and consequently also between upper and lower portions of an upright structural support or stanchion which still retain their respective, now damaged, connector portions or sections;

All connectors have secondary bendable structure which will protect supported meters and signs, for example, from any damage or further damage, which would otherwise occur, due to striking objects or the ground upon their falling following a vehicle impact;

All connectors have continuing structural continuity afforded by secondary bendable structure to prevent unauthorized removal of such uprights and, for example, their installed meters and signs;

Each connector has a central potential reserve or standby coupling which also concurrently serves as a pulling link or coupling to remove resulting connector portions or sections from their surrounding respective portions or sections of the major upright structural standard, support or stanchion during repair operations undertaken to return, for example, a damaged meter or sign assembly to active traffic service.

A preferred embodiment of this invention is a connector assembly which comprises: for inclusion in a supporting structure, a connector, coupling, or insert body having a reduced thickness cross-section between its ends; spaced external, longitudinal protrusions, ribs, or lands on the connector body exterior, each protrusion having an overall connector body matching reduced thickness cross-section, and tapered ends at or near the connector body ends; securing means at each end or near end of the connector body; and a bendable coupler extending between such securing means to effectively keep near together connector body portions on either side of the reduced thickness cross-section following their parting upon sustaining damaging impact forces such as are caused by a moving vehicle.

Embodiments of the invention are illustrated in the drawings, wherein:

FIGURE 1 is a perspective view of an upright structure which includes a preferred embodiment of an installed frangible-bendable connector assembly to protect such upright structure and, for example, a parking meter it supports near a street curb, some portions being removed to show placement of the connector.

FIGURE 2 is an enlarged side elevation with some portions broken away, of only the frangible-bendable connector assembly of FIGURES 1 and 2;

FIGURE 3 is an enlarged side elevation with some portions broken away, of a lower portion of the upright structure which is encompassing the frangible-bendable connector assembly indicating also a variation in the pavement attachment of the upright structure;

FIGURE 4 illustrates lower portions of an upright structure and its modified frangible-bendable connector, also used where the pavement attachment is similar to that shown in FIGURE 3;

Figure 6:
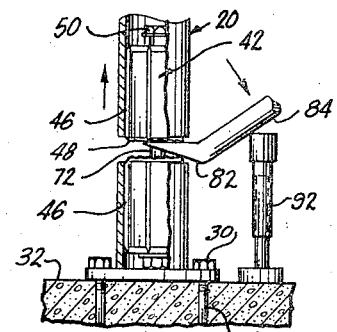
Figure 7:
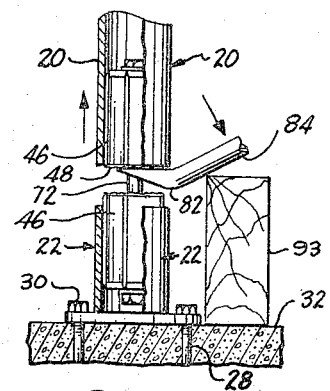
Figure 9:
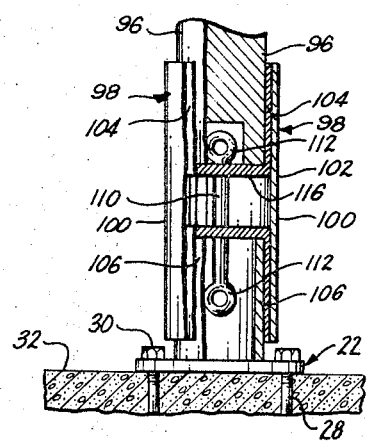
Figure 10:
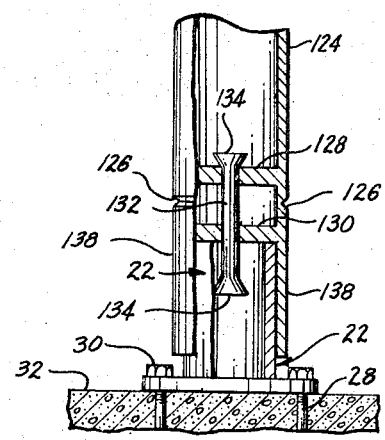
Figure 8:
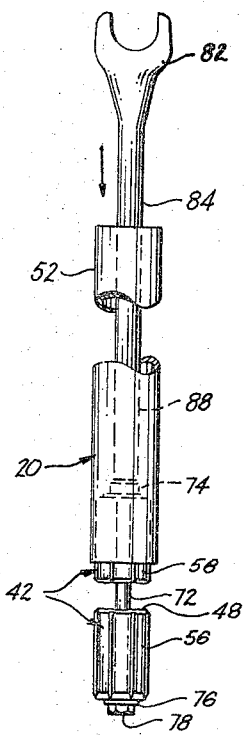

FIGURES 6 and 7 indicate how repair tools are used to disassemble many components of the assembly after damage has occurred;

FIGURE 8 further indicates, after removal of a parking meter, how a repair tool, with its handle end first, is inserted through the upright structure to push out damaged frangible-bendable connector portions in preparation for installing a new connector in repairing the entire upright structural assembly;

FIGURE 9 illustrates another embodiment wherein the frangible-bendable connector is fitted outside the portions of an upright structure and a modified bendable portion is shown; and FIGURE 10 illustrates another embodiment wherein a frangible-bendable connecting portion is made a part of the top piece of the upright structure and another modified bendable portion is shown.

The invention, in its embodiments illustrated in these figures and in comparable embodiments (not shown), is principally directed to substantially reducing costs and associated time spent in repairing and replacing upright supporting structures which are damaged by misdirected vehicles. An outstanding cost and time reduction is realized in repair and replacement of parking meter installations such as illustrated in FIGURE 1. By necessity, they are located near curbs and are consequently struck by vehicles which may be only slightly misdirected. Oftentimes, delivery trucks during angular backing maneuvers, strike parking meter installations. Where existing concrete has been black-topped, the reduced curb heights often fail to redirect a vehicle and installations are struck. During winter snow conditions all curbs are overrun quite easily. Also during and after heavy snow falls, curbs and meters are obscured by drifts or snow plow piles of snow and, as a result, parking meter and other traffic installations, not seen, are struck. Fortunately, in many instances, striking vehicles are moving comparatively slowly and can be stopped before complete overrunning occurs of traffic equipment such as parking meters. Whether or not partial or complete repairs are necessary, this invention reduces repair costs and associated time.

The invention is utilized when either making repairs to a damaged installation or erecting a new installation. When repairs are made to a damaged installation in which the invention had been previously incorporated, considerable saving of costs and time is realized.

As noted in FIGURE 1, lower portions 22 of upright supporting structures 20 may be flanged 24, drilled 26, and secured with anchor bolts 28 and nuts 30 to supporting sidewalks 32 near curbing 34 and street pavements 36. Or lower portions 22 may be set directly into concrete recesses 38, preferably when the concrete is poured, as shown in FIGURE 3. Where primary attachment is undertaken in either of these constructions, or one of comparable permanency, as generally occurs wherever parking meter installations are completed, any resulting change or replacement of cemented in anchor bolts 28 or lower portions 22 is costly and time consuming. Concrete chipping and new concrete work substantially increases overall costs and time of undertaking repairs. Generally heavy and cumbersome repair tooling is often needed and the inconvenience in transporting and operating such heavy equipment adds to costs and time consumed. Therefore, for example, when a parking meter installation 40 is damaged, if repairing of upright structure 20 may be done quickly with minimum tooling and substantially complete avoidance of reworking primary attachments 22 generally involving concrete work, then very considerable time and cost savings are realized. To insure that such reworking of primary attachments 22 is not needed in substantially all repair work, this invention provides a connecting and coupling structural assembly 42 which protects primary attachment portions 22 of upright supporting structure 20. Moreover, where a striking vehicle stops before or overruns without completely destroying traffic control apparatus 44 such as a parking meter, sign or light, the connecting and coupling structural assembly 42 also protects such apparatus 44 from damage which might otherwise occur upon complete failure of upright supporting structure 20 causing a parking meter 44, for example, to strike pavement of the sidewalk 32 or street 36.

As shown in FIGURE 2, this invention in such connecting and coupling structural assembly 42, provides upright holding and positioning structure serving both as a connector 46 between primary attachments 22 and any balance of upright supporting structure 20 and also as localized frangible parking structure 48 which breaks upon an impact received anywhere on an entire installation 40. In addition, the invention provides bendable coupling structure 50 cooperatively serving to limit separation of any such separated balance of upright supporting structure 20 from primary attachments 22.

FIGURES 1 through 7, inclusively, show preferred embodiments of the invention, wherein connecting and coupling structural assembly 42 is an inserted assembly as shown in FIGURE 2 before installation and in FIGURE 3 after installation. This assembly 42 has a connector body 46, which serves upon installation and before impact, as a holding and positioning structure to join top portion 52 of the upright supporting structure 20 to its lower portion 22. In so doing, connecting body 46 is driven into both lower 22 and top 52 portions approximately to the same depth, leaving a slight distance between them. At this substantial midpoint of connecting body 46, its thickness is less to form a predetermined breaking structure 48. Such structure 48 in this embodiment is formed by making an annular cut.

To facilitate the interfitting of lower 22 and top 52 portions of upright supporting structure 20 with respective lower 56 and top 58 portions of connector 46, this connector 46 is composed of a smaller diameter, cylindrical body 64 having exterior, spaced, longitudinal lands, protrusions, or ribs 66 which are clear of or are cut away completely in the plane of the breaking structure 48. Also, at both the top and bottom of connector 46, these lands 66 are tapered 68 into cylindrical body 64. Upon installation of connector, sleeve or insert 46, these tapered land ends 68 combined with the smaller diameter body 64, to make the starting alignment and insertion a quick operation.

The coupling structure 50 of assembly 42 is bendable and positioned to allow some movement between the impact separated lower 56 and top 58 portions of connector body 46. In the preferred embodiment such coupling structure 50 utilizes a bendable bolt member 72 with a limiting or restrictive head 74 and washer 76 at one end and a like functioning threaded nut 78 and washer 76 at its opposite end. This combined centered, bendable, restrictive coupler 50 is longer than connector body 46. As a way of slidably but restrictively connecting bendable member 72 of coupler 50 to frangible member 46, the latter includes restrictive structure 60 located at or near each of its ends and, more importantly, essentially spaced apart from the thinner section 48, each of which have an opening to slidably admit bendable member 72 but to obstruct either its head 74 or nut 78 and their associated washers 76.

As noted in FIGURE 2, in a preferred embodiment, this restrictive structure 60 results from forming a central, longitudinal hole of a diameter large enough to pass bolt 72 but small enough to abut bolt head 74, nut 78 and the respective washers 76.

Although in FIGURE 2, the remaining cross-section of connector body 46 appears to be too large and consequently too strong and therefore ineffective in having a predetermined breaking load below that required to break upright supporting structure 20 at any other place, this misleading appearance is explained away by realizing what materials are used. Preferably, a weaker material such as aluminum casting containing 96% aluminum and over 3% magnesium is used in making connector 46. Each connector body 46 is formed to include a minimal cross-section 48, where breakage will occur at this weakest location within the connector structure and not elsewhere at any place in the upright structure 20 because the balance of such upright supporting structure 20 is always made stronger. In the preferred embodiment this stronger material is standard black iron pipe or galvanized pipe. In all embodiments, the inherent material strengths must be considered thoroughly so the minimum cross-section of any connector body is in fact the weakest cross-section of the entire upright supporting structure.

This frangible connecting and bendable coupling structural assembly in this preferred embodiment is inserted in new installations where the upright supporting structure 20 is fabricated and installed having its lower primary attachment structure 22 and top principal upright portion 52. It is also inserted in repairing damaged, overall installations 40 wherein the original upright supporting structure 20 was continuous, being itself primarily attached at its bottom to pavement on sidewalks 32. In making such repairs, upright structure 20 is cut approximately three and one-half inches above pavement level, depending on the size of the connector to be installed, when, for example, a parking meter installation 40 is undergoing repairs.

Figure 5:
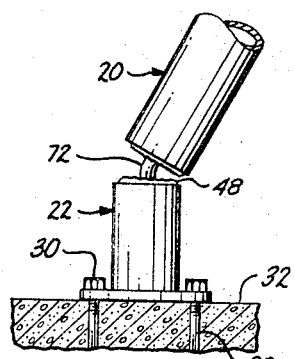
FIGURE 5 illustrates what occurs upon vehicle impact, showing the resulting positions of lower portions of an upright structure and its frangible-bendable connector.

Following fitting of this preferred embodiment 42, either in a new or modified installation, an impact caused by a comparatively slower moving vehicle in a curb land will, in all probability, damage an upright supporting structure 20 as indicated in FIGURE 5. Upper portions, respectively 52, 58 of upright structure 20 and connector body 46 will be bent to one side, causing severance of connector body 46 and bending of coupling structure 50. Because of vehicle bumper heights and drivers' reaction times at these slower curb land speeds, generally the positioning indicated in FIGURE 5 will hold true. Therefore, in these resulting damage situations, traffic control apparatus 44, such as a parking meter, is not directly bumped and coupling subassembly 50 of this preferred embodiment insert 42 arrests its fall before it strikes any hard pavement and sustains damage necessitating its replacement.

In this controlled damaging blow situation, wherein a meter, for example, is spared from damage, the invention underwrites maximum time and cost savings. But, regardless of the degree of severity of any impact, very substantial savings are to be realized. In FIGURES 6, 7 and 8, suggestive usage of repair tooling is shown which indicates how conveniently and quickly a damaged installation 40 can be reworked on location with comparative ease and by using low cost, easily transported tools.

The bent upright structure shown in FIGURE 5 is moved back to an upright position, as shown in FIGURE 6. Then, a forked and offset end 82 pry bar 84 is inserted, in gap 86 and thereafter pivoted downwardly at its handle end 88, as shown in FIGURES 6 and 7. Such prying action incrementally raises all the above located components and the upwardly moving coupling structure 42 assures like upward movement of lower end portion 56 of the damaged connector body 46. A wood block 93 or an adjustable height fulcrum tool 92 is used in conjunction with pry bar 84 in undertaking this raising-pulling disassembly operation. Use of fulcrum tool 92 makes this removal of such connector components much more convenient, positive and less time-consuming.

Once these above located components are cleared from remaining lower portion primary attachment structure 22, they are repositioned freely to undertake removal of top portion 58 of then damaged connector body 46. Such removal is conveniently and quickly accomplished by inserting pry bar 84, its handle end 88 first, through interior of upright supporting structure 20 and driving out connector body portion 58 while restraining supporting structure 20.

After removal of both lower 56 and top 58 portions of connector body 46, reassembly of an entire installation 40 is undertaken by fitting a new connector and coupling assembly 42. Its lower portion 56 is driven into primary attachment lower supporting portion 22 and thereafter the same top portion 52 of upright support 20 or possibly a new one, if needed, is driven over the exposed top portion 58 of such connector and coupling assembly 42.

As thus reassembled after damage, rebuilding, or an initial installation, the resulting entire installation 40, such as a parking meter assembly shown in FIGURE 1, presents a structure of sufficient strength for normal usage short of a substantial impact. Its exterior appearance except for the spacing at frangible structure 48, is similar to integral upright supporting structures which are continuous throughout their length from their primary attachment structure.

There are, however, other embodiments which may be preferred by those who will utilize the invention because manufacturing costs, installation procedures and/or overall design considerations, for example, may lead them to employing such embodiments.

Where any embodiment is to be inserted and therefore necessarily driven into place, the necessity is readily observed of having the connector's minimum cross section 48 be located after assembly in the same horizontal plane with the space between upper portion 52 and lower portion 22 of upstanding structure 20. As shown in FIGURE 1, this is assured by having the height of primary attachment structure 22 be equal to or slightly less than one-half the length of connector body 46 plus added length of bolt head 74 or bolt nut 76 and its respective washer. Then when connector 42 is driven down into primary structure 22, bolt head 74 or nut 76 and washer and connector body 46 all bottom on the flange 22 at the pavement level and remain in position.

Where, however, as shown in FIGURE 3, there is no flange on the primary attachment structure and it is directly embedded in concrete, precise bottoming of the connector is not possible and there is little control during installation in assuring where the location of the minimum cross section will be. Therefore, insertion limit pins 54 are relied upon as a position determining means. A connector assembly 42 is first driven into the top portion of the upright supporting structure 52 which is equipped with such limit pins 54 to precisely control the placement of its most frangible structure or minimum cross section 48. Thereafter the top portion with its installed connector assembly 42 is driven into the embedded primary attachment structure until the minimum cross section is positioned at its top as illustrated in FIGURE 3.

In FIGURE 4, a connector body 46 is illustrated as having an insertion limiting flange 55 which is relied upon as a position determining means. A connector assembly 42 with such a flange 55 is driven into an embedded primary attachment structure 22 first until the flange 142 makes contact and thereafter the top 52 of upright supporting structure 20 is driven down and over it until the most frangible structure or minimum cross section 48 is reached but left clear as shown.

In FIGURES 9 and 10, some other possible embodiments have been illustrated. In FIGURE 9, top portions 96 of upright supporting structures are made from perhaps solid materials such as wood, or other materials of various cross-sections which require that the connecting and coupling assembly 98 be designed to be on the outside as shown in FIGURE 9. The thinner frangible section 100 results by using a continuous sleeve 102 which is prefabricated with end cup-like receivers 104 top and 106 bottom. A cable 110 with looped ends 112 serves as bendable coupling structure 114, the looped ends being slidably restricted to transverse structure 116 of receivers 104, 106.

When more upright supporting structure is considered to be expendable and curbside installation times are to be further reduced, top portions 124 of upright supporting structures 20 are made, as shown in FIGURE 10, to include in their respective lower portions frangible structure 126 located between transverse structures 128 and coupled, for example, by a preformed link 132 with its restrictive heads 134, all arranged just above its cuplike receiver 138 which is of a size to complement an exterior of a primary attachment portion 22.

Although iron pipe and aluminum alloys are known, as shown in some of the illustrated embodiments, to be suitable materials, other materials are used. Certain plastics serve as either the complete material for a connector body or as an added material such as a coating or filler. Also, although driving assembly of interfitting components has been referred to in describing illustrated embodiments, reliance on bonding agents such as glue and mastics is undertaken in interfitting and holding together components of these upright supporting structures.

Throughout all embodiments of different parts and materials there are initially similarly positioned structures and there are subsequently similarly functioning structures upon and after impact. Each embodiment preferably has a lower portion which is a primary attachment structure of minimum height and also of quite permanent attachment to ground level supporting materials such as sidewalk pavements. Each embodiment has a thinner structure near its primary attachment structure to predetermine a breaking location when an impact occurs. Each embodiment, once damaged, is comparatively easily reworked and reinstalled, potentially underwrites substantial savings to be realized if an overall installation is damaged upon receiving an impact.

I claim:

1. Structure for connecting an upper support member to a lower anchored support member comprising a sacrificial self-contained connector assembly, said connector assembly having an upper section adapted for connection to the lower end of said upper support member and a lower section adapted for connection to the upper end of said lower anchored support member to rigidly connect said support members with the adjacent ends of said support members being spaced apart about the central region of said connector assembly, said central region of said connector assembly being frangible upon impact applied to said upper support member, said connector assembly having axially spaced upper and lower bearing surfaces, and a bendable retainer carried by said connector assembly, said retainer having upper and lower axially spaced bearing surfaces, the spacing between the bearing surfaces on said retainer being greater than the spacing of the bearing surfaces on said connector assembly whereby said retainer loosely connects said upper and lower connector sections and is operable when said connector assembly has been broken to maintain said upper support member connected to said lower anchored support member while permitting limited axial separation of said connector sections sufficient to accommodate controlled tilting movement of said upper support member with respect to said lower anchored support member.

2. The structure according to claim 1 wherein said upper and lower support members are hollow and said upper and lower connector sections extend within the ends of said support members and surface formations on said connector sections adapted to frictionally engage said upper and lower support members.

3. Structure according to claim 1 wherein said upper and lower connector sections are hollow and are adapted to fit around the adjacent ends of said upper and lower support members, respectively, for frictional connection thereto.

4. The structure according to claim 1 wherein said bendable retainer is a bolt extending loosely through a central aperture in said connector assembly.

References Cited

UNITED STATES PATENTS

| | | | |
|---|---|---|---|
| 286,182 | 10/1883 | Cunningham et al. | |
| 423,633 | 3/1890 | Saxon et al. | 287—189.36 |
| 433,001 | 7/1890 | Hall | 287—189.36 |
| 1,013,410 | 1/1912 | Lynch | 52—297 X |
| 1,606,697 | 11/1926 | Dean | 52—296 X |
| 1,800,010 | 4/1931 | Emerson. | |
| 1,805,731 | 5/1931 | Beckwith | 52—296 X |
| 1,839,690 | 1/1932 | Malinowski | 285—2 |
| 1,944,777 | 1/1934 | Banks | 285—3 X |
| 2,048,388 | 7/1936 | Johnson | 285—4 X |
| 2,085,074 | 6/1937 | Boyles | 287—108 |
| 2,679,911 | 6/1954 | Bhend. | |
| 2,949,324 | 8/1960 | Birge et al. | |
| 3,127,870 | 4/1964 | Bieber. | |
| 3,204,355 | 9/1965 | Whitman | 40—145 X |

FOREIGN PATENTS

| | | |
|---|---|---|
| 1,182,384 | 10/1961 | France. |

EARL J. WITMER, *Primary Examiner.*

HARRISON R. MOSELEY, DENNIS L. TAYLOR,
*Examiners.*